US011476661B2

(12) United States Patent
Shinoda et al.

(10) Patent No.: US 11,476,661 B2
(45) Date of Patent: Oct. 18, 2022

(54) DEVICE FOR CONTROLLING A TERMINAL FOR THE COMPENSATION OF A VOLTAGE DISTURBANCE

(71) Applicants: SUPERGRID INSTITUTE, Villeurbanne (FR); CENTRALESUPELEC, Gif-sur-Yvette (FR)

(72) Inventors: Kosei Shinoda, Lyons (FR); Jing Dai, Gif-sur-Yvette (FR); Abdelkrim Benchaib, Montigny le Bretonneux (FR); Xavier Guillaud, Bachy (FR); Bruno Luscan, Lyons (FR)

(73) Assignees: SUPERGRID INSTITUTE, Villeurbanne (FR); CENTRALESUPELEC, Gif-sur-Yvette (FR)

( * ) Notice: Subject to any disclaimer, the term of this patent is extended or adjusted under 35 U.S.C. 154(b) by 374 days.

(21) Appl. No.: 16/763,600

(22) PCT Filed: Nov. 16, 2018

(86) PCT No.: PCT/FR2018/052874
§ 371 (c)(1),
(2) Date: May 13, 2020

(87) PCT Pub. No.: WO2019/097183
PCT Pub. Date: May 23, 2019

(65) Prior Publication Data
US 2020/0389014 A1 Dec. 10, 2020

(30) Foreign Application Priority Data
Nov. 17, 2017 (FR) ...................... 17 60889

(51) Int. Cl.
H02H 9/04 (2006.01)
H02J 3/38 (2006.01)
H02J 4/00 (2006.01)

(52) U.S. Cl.
CPC ............... *H02H 9/04* (2013.01); *H02J 3/381* (2013.01); *H02J 4/00* (2013.01); *H02J 2300/28* (2020.01)

(58) Field of Classification Search
USPC ....................................... 361/91.1
See application file for complete search history.

(56) References Cited

U.S. PATENT DOCUMENTS

2015/0116876 A1* 4/2015 Whitehouse ............. H02H 3/06
361/66
2015/0134132 A1* 5/2015 Feng .................... G06Q 10/063
700/286
2019/0074685 A1* 3/2019 Leon Garcia ............ H02H 7/28

OTHER PUBLICATIONS

Radnya Anant Mukhedkar; Converter Scheme; EP 3467987; Figure 1 and entire specification (Year: 2019).*

(Continued)

*Primary Examiner* — Dharti H Patel
(74) *Attorney, Agent, or Firm* — Workman Nydegger

(57) ABSTRACT

Disclosed is a device for controlling a terminal connected in a multi-terminal high-voltage direct current transmission facility, the terminal being able to provide or draw power on the DC part of the facility comprised between an upper power limit and a lower power limit, the device further comprising at least one regulation circuit configured to vary the power provided or drawn by the terminal on the DC part of the facility, as a function of a voltage variation on the DC part of the facility, the device further comprising a limitation circuit configured to limit the variation of the power provided or drawn by the terminal, for a given voltage variation, when the power difference between the power provided or (Continued)

drawn by said terminal and the upper power limit or the lower power limit becomes smaller than a determined value.

15 Claims, 5 Drawing Sheets

(56) References Cited

OTHER PUBLICATIONS

Carl David Barker; EP 3322062; Improvements in or relating to power transmission networks; Figure 1 and entire specification (Year: 2018).*

Temesgen Haileselassie, Kjetil Uhlen & Tore Undeland: "Control of Multiterminal HVDC Transmission for Offshore Wind Energy", Nordic Wind Power Conference, Sep. 10, 2009-Sep. 11, 2009, pp. 1-7, XP002783305, p. 5, Trondheim, Norway.

L. Xu et al: "DC voltage control and power dispatch of a multi-terminal HVDC system for integrating large offshore wind farms", IET Renewable Power Generation, vol. 5, No. 3, May 3, 2011, pp. 223-233, XP055494734, Michael Faraday House, Six Hills Way, Stevenage, Herts. SG1 2AY, UK ISSN: 1752-1416, DOI: 10.1049/iet-rpg.2010.0118 p. 225, Stafford, UK.

Li Wenting et al: "A novel nontrol strategy for AC fault ride through in a MTDC system with offshore wind farms", 2014 International Power Electronics and Application Conference and Exposition, IEEE, Nov. 5, 2014, p. 6pp, XP032734710, DOI: 10.1109/PEAC.2014.7037828 p. 2-p. 3, Shanghai, China.

* cited by examiner

DEVICE FOR CONTROLLING A TERMINAL FOR THE COMPENSATION OF A VOLTAGE DISTURBANCE

BACKGROUND

The present disclosure relates to the technical field of multi-terminal high-voltage direct current (HVDC) transmission facilities and more particularly to a device for controlling a terminal of such a facility.

Such HVDC facilities allow the transmission of electricity over long distances by means of direct current lines of several hundred kilometers, these direct current lines forming a DC part of said facilities. These facilities therefore allow the transmission of a direct current, rather than an alternating current as it is the case in traditional facilities. They are particularly used for the electric transmission from or to the offshore wind farms.

The terminals of these facilities generally allow converting an AC voltage into a DC voltage and vice versa, these terminals being connected between an AC power supply network and the DC part of said facility. Each of these terminals provides or draws power on the DC part of the facility.

An example of such an HVDC facility 14 is shown in FIG. 1. In this example, first 100, second 200, third 300 and fourth 400 terminals are connected respectively to first 102, second 202, third 302 and fourth 402 AC power supply networks. These four terminals are also connected to a DC part 16 of the facility via DC lines. In this example, the fourth terminal 400 is connected to a wind farm and transfers constant power to the DC part 16 of the facility.

In practice, the voltage of the DC part of this type of facility is varied. For example, a terminal may fail or be disconnected from the DC part of the facility, or from one of the AC power supply networks, for maintenance operations. In this case, the terminal no longer provides or draws power on the DC part of the facility, so that an overall imbalance appears between the power drawn and the power provided on the DC part of the facility. The provided or drawn power as well as the voltage of the DC part jointly increase or decrease. For example, the fourth terminal 400 may fail, so that the power provided to the DC part and therefore the voltage of the DC part of the facility decreases.

Control devices are known according to the prior art allowing the control of the terminals of a facility in order to compensate for the loss of power of the DC part, by increasing the power contribution of each of the remaining terminals 100, 200, 300.

An example of such compensation carried out by a device according to the prior art is given in FIG. 2. The graph in FIG. 2 represents the change in the voltage of the DC part 16 of the facility 14 of FIG. 1, as a function of the power provided or drawn by each of the terminals controlled by the device according to the prior art, on said DC part. $P_5$ is a characteristic curve representing the voltage variation in the DC part 16 of the facility in the event of an imbalance between the power drawn and the power provided on the DC part of the facility, for example following a failure of the fourth terminal 400. A power deficit $\Delta P_{dis}$, equivalent to 500 MW, appears due to the loss of the fourth terminal which initially provided a 500 MW power to the DC part of the facility. This power deficit experienced by the facility leads to a decrease in the voltage of the DC part, of a voltage $\Delta V_{dc}$. The voltage of the DC part, which was initially equal to $V_{dc0}$ is now equal to the modified voltage $V'_{dc}$.

To compensate for this power deficit in the DC part of the facility and this voltage drop of the DC part, the control device according to the prior art proposes to vary the powers provided or drawn by the first 100, second 200 and third 300 terminals as a function of the voltage drop in the DC part 16 of the facility. These power variations are linear, they are represented respectively by the curves $P_1$, $P_2$, $P_3$ and $P_4$. The curves $P_1$, $P_2$, $P_3$ and $P_4$ make it possible to define respectively compensation powers $\Delta P_1$, $\Delta P_2$ and $\Delta P_3$ which can be provided by the first 100, second 200 and third 300 terminals to compensate for the voltage drop $\Delta V_{dc}$ of the DC part of the facility. It is observed that the change of the curves $P_1$, $P_2$, $P_3$ and $P_4$ is identical so that the compensation powers $\Delta P_1$, $\Delta P_2$ and $\Delta P_3$ are equal and verify:

$$\Delta P_1 = \Delta P_2 = \Delta P_3 = -\frac{\Delta P_{dis}}{3}$$

In practice, the power provided or drawn by each of the terminals on the DC part of the HVDC facilities is however limited by an upper power limit and a lower power limit. These upper and lower power limits are set by the manufacturer. When the power provided or drawn by a terminal reaches one of these power limits, said terminal may be damaged. Said upper and lower power limits define a nominal operating range of the converter. FIG. 3 illustrates the change of the power provided or drawn by the terminals of FIG. 1, controlled by a device according to the prior art, taking into account these limits. In this example, the second terminal 200, which was drawing power on the DC part of the facility, fails, its curve being marked with a cross. A power disturbance appears and the voltage of the DC part 16 undergoes an undesired increase. The upper $P_{max}$ and lower $P_{min}$ power limits of the terminals are respectively equal to 1000 MW and −1000 MW.

When the power provided or drawn by one of the terminals reaches the upper or lower power limit, this terminal must be put in saturation so as not to be damaged. The power it provides or draws on the DC part is then kept constant. In the example of FIG. 3, the second terminal fails, resulting in a decrease of the power drawn on the DC part of the facility, which must be compensated by the first and third terminals. The power drawn by the first terminal 100 reaches the lower power limit $P_{min}$, before the modified voltage $V'_{dc}$ of the DC part is reached. Also, this first terminal 100 is put in saturation so that the power it draws can no longer vary. Consequently, the terminal 100 cannot draw more power to interrupt or compensate for the voltage increase. It therefore no longer contributes to compensating for the voltage increase on the DC part. The compensation is then continued by the other terminals whose provided or drawn power can still vary, in this case by the third terminal, which is still not sufficient to compensate for the voltage increase of the DC part 16 and moreover may cause a new voltage increase of the DC part of the facility, which is not desirable.

SUMMARY

An object of the present disclosure is to propose a device for controlling a terminal of an HVDC facility overcoming the aforementioned problems.

To do so, the disclosure relates to a device for controlling a terminal connected in a multi-terminal high-voltage direct current transmission facility, the terminal being connected between a first AC power supply network and a DC part of said facility, the terminal being able to provide or draw power on the DC part of the facility comprised between an upper power limit and a lower power limit, the device further comprising at least one regulation circuit configured to vary the power provided or drawn by the terminal on the DC part of the facility, as a function of a voltage variation on the DC part of the facility, the device further comprising a limitation circuit configured to limit the variation of the power provided or drawn by the terminal, for a given voltage variation, when the power difference between the power provided or drawn by said terminal and the upper power limit or the lower power limit becomes smaller than a determined value.

The facility can comprise from two to several tens of terminals, including the terminal controlled by the control device according to the disclosure. Said terminal constitutes an interface between the DC part of the facility and the first AC power supply network.

The DC part of the facility allows the transmission of the direct current between the terminals of said facility. It may comprise one or several direct current transmission lines connecting said terminals.

In addition, the AC power network may comprise one or several alternating current transmission lines. These lines can be connected to an alternating current source, for example of a wind farm.

Preferably, the terminal comprises at least one voltage converter making it possible to convert an alternating voltage into a direct voltage and vice versa. In a non-limited manner, this converter can be a modular multilevel converter (MMC) in half-bridge (HB), a converter in full bridge (FB) or a converter having a structure in Alternate Arm Converter (AAC). These structures are well known to those skilled in the art.

The power provided or drawn by the terminal on the DC part of the facility represents the contribution of said terminal on the DC part of the facility. When the terminal provides power, denoted by a positive sign, the terminal operates in rectifier mode and acts as a generator. When the terminal draws power, denoted by a negative sign, on the DC part, the terminal operates in inverter mode and acts as a load. The HVDC facilities generally comprise these two types of terminals.

The upper and lower power limits are limits of operation of the terminal beyond which the terminal may be damaged and is no longer able to provide or draw power on the DC part of the facility. When the power drawn or provided by a terminal reaches one of these limits, it must be put into saturation.

The voltage variation in the DC part of the facility can be caused by a failure, for example by one of the other terminals of the facility, or by maintenance operations. The failure of a terminal leads to a disturbance in the power of the facility, and therefore a positive or negative power variation in the DC part of the facility, which is not desirable. This power disturbance leads to a proportional increase or decrease in the voltage of the DC part.

The regulation circuit is configured to increase or decrease the power provided or drawn by the terminal on the DC part in order to compensate for this power disturbance and therefore limit the voltage variation in the associated DC part. More preferably, the regulation circuit allows interrupting the voltage variation and more preferably compensating for said voltage variation. The terminal is therefore able to provide a positive or negative compensation power to limit, interrupt or compensate at least partially for such a voltage variation on the DC part of the facility. The regulation circuit is preferably, but without limitation, locally implanted in the vicinity of the terminal.

The limitation circuit allows limiting the variation of the power provided or drawn by the terminal, in response to a given voltage variation, when this power is close to the upper or lower power limit. One advantage is to prevent the power drawn or provided by the terminal from reaching this limit and thus avoid having to deactivate the action of compensation of the voltage variation, by putting the terminal into saturation. Consequently, thanks to the disclosure, the compensation carried out by the terminal is reduced when approaching its lower or upper power limit and the power provided or drawn by the terminal is maintained between the lower and upper power limits. The behavior of the terminal is therefore anticipated and better controlled, which improves the stability of the entire facility.

Unlike the solutions of the prior art in which the power provided or drawn by a terminal, to limit a voltage variation on the DC part, varies in an identical and linear manner for all the terminals, the device according to the disclosure makes it possible to take into consideration the initial contribution of the terminal, that is to say the power it initially provides or draws on the DC part, and to adapt the variation of the power provided or drawn by this terminal to its operating limits, in order not to reach these limits. The behavior of the terminal is adapted when the power it provides or draws approaches the power limits.

The power difference between the power provided or drawn by said terminal and the upper power limit or the lower power limit is preferably calculated in real time.

The determined value of the power difference below which the limitation circuit is configured to limit the variation of the power provided or drawn by the terminal can be chosen arbitrarily by an operator or can be a function of the state of the terminal or of the facility.

In a non-limiting manner, the limitation circuit can limit the variation of the power provided or drawn by the terminal by providing the regulation circuit with limitation data or by sending a limitation signal to the regulation circuit. The regulation circuit adapts the variation of the provided or drawn power, for a given voltage variation, based on the limitation data or on the limitation signal provided by the limitation circuit.

Preferably, the regulation circuit is configured to increase the power provided or decrease the power drawn by the terminal on the DC part of the facility in the event of a voltage drop on the DC part of the facility. Hereinafter, the expression "increase in the provided power" corresponds to a power variation in the positive sense. Also, an increase in the provided power tends to move the provided power away from zero power. Likewise, a "decrease in the drawn power" corresponds to a positive variation in the drawn power.

A drop in the provided power or an increase in the drawn power on the DC part of the facility results in a voltage drop of the DC part which must be compensated. For example, the failure of another terminal of the facility initially providing power to the DC part of the facility implies a power deficit in the DC part. In this case, the regulation circuit makes it possible to increase the power provided or decrease the power drawn by the terminal in order to increase the power of the DC part. The terminal then provides a positive compensation power.

Advantageously, the limitation circuit is configured to limit the increase in the power provided or the decrease in the power drawn by the terminal on the DC part of the facility, for a given voltage drop, when the power difference between said power provided or drawn by the terminal and the upper power limit becomes smaller than the determined value. In this way, when approaching the upper power limit, the compensation power provided by the terminal is reduced, for a given voltage drop. The risk that the power provided or drawn by the terminal reaches the upper power limit is therefore reduced.

For example, when the terminal operates in rectifier mode, it initially provides high power to the DC part of the facility, close to its upper power limit, so that the difference between the power provided by the terminal and the upper limit is smaller than the determined value. If a voltage drop occurs on the DC part of the facility, said terminal can then only provide a low compensation power. The power it provides to the DC part can only increase slightly before reaching the upper power limit. Thanks to the disclosure, the increase of the power it provides, for a given voltage drop, and therefore the provided compensation power, are limited and the power provided by the terminal is maintained below said upper power limit.

One advantage is to improve the control of the terminal and the stability of the facility in the event of a voltage drop.

Advantageously, the regulation circuit is configured to decrease the power provided or increase the power drawn by the terminal on the DC part of the facility in the event of a voltage increase on the DC part of the facility. Hereinafter, the expression "decrease in the provided power" designates a variation in the power provided in the negative sense. Also, a decrease in the provided power makes the provided power tend to zero power. Likewise, an increase in the drawn power moves the drawn power away from zero power. A terminal whose drawn power on the DC part increases therefore tends to draw more power.

An increase in the provided power or a decrease in the drawn power on the DC part of the facility leads to an increase in the voltage of the DC part which must be compensated. For example, the failure of another terminal of the facility drawing power from the DC part of the facility implies an excess of power in the DC part. The regulation circuit allows in this case decreasing the power provided or increasing the power drawn by the terminal, in order to decrease the power of the DC part. The terminal then provides negative compensation power.

Preferably, the limitation circuit is configured to limit the decrease of the power provided or the increase of the power drawn by the terminal on the DC part of the facility, for a given voltage increase, when the power difference between said power provided or drawn by the terminal and the lower power limit is smaller than the determined value.

In this way, when approaching the lower power limit, the negative compensation power provided by the terminal is reduced, for a given voltage variation. The risk that the power provided or drawn by the terminal reaches the lower power limit is therefore reduced.

For example, when the terminal operates in inverter mode, it initially draws high power on the DC part of the facility, close to its lower power limit. If an increase in voltage occurs on the DC part of the facility, said terminal can then only draw an additional small compensation power. The power it draws from the DC part can only increase slightly before reaching the lower power limit. Thanks to the disclosure, the increase of the power it draws and therefore the drawn compensation power are limited and the power drawn by the terminal is kept above said lower power limit.

One advantage is here again to improve the control of the terminal and the stability of the facility in the event of an increase in the voltage of the DC part.

Advantageously, the limitation circuit is configured to increase the variation of the power provided or drawn by the terminal on the DC part of the facility, for a given voltage variation, when the power difference between said power provided or drawn by the terminal and the upper power limit or the lower power limit is greater than an additional determined value. One advantage is to allow the terminal to contribute more to compensating for the voltage variation on the DC part when the power it provides or draws on the DC part is far from its upper power limit or its lower power limit.

The terminal can for example initially provide a low power to the DC part of the facility, much lower than its upper power limit, so that the difference between the power provided by the terminal and the upper limit is greater than the additional determined value. If a voltage drop occurs on the DC part of the facility, said terminal is then able to provide high compensation power. The power it provides to the DC part can increase significantly.

The additional determined value is preferably greater than the determined value. Without departing from the scope of the disclosure, the additional determined value may be equal to the determined value.

Preferably, the limitation circuit comprises a management circuit configured to allocate to the terminal an upper power compensation limit $P_{upper}$ and a lower power compensation limit $P_{lower}$ from maximum and minimum power values provided by the first AC power supply network and from operating power setpoints of the terminal.

Said maximum and minimum power values correspond to upper and lower power limits that the first AC power supply network is capable of providing.

The upper $P_{upper}$ and lower $P_{lower}$ compensation limits define respectively an upper power range and a lower power range, allocated to the terminal, in which the power provided or drawn by the terminal can vary. This upper power range is also called UVCR (Under Voltage Containment Reserve) and this lower power range is also called OVCR (Over Voltage Containment Reserve).

UVCR corresponds to a power range in which the power provided or drawn by the terminal can vary in order to compensate for a voltage drop of the DC part. It can be calculated according to the following expression:

$$UVCR = (P_{upper} - P_0)$$

$P_0$ being the power provided or drawn by the terminal in the absence of disturbance.

OVCR corresponds to a power range in which the power provided or drawn by the terminal can vary in order to compensate for an increase in the voltage of the DC part. It can be calculated according to the following expression:

$$OVCR = (P_{lower} - P_0)$$

The terminal can therefore provide a compensation power comprised in the upper or lower power range. These limits depend on operating data of the terminal, so that the control of the terminal is better controlled. They can be chosen so as not to damage the terminal and to comply with its operating constraints.

Preferably, the lower power range OVCR is determined so as to satisfy the equation:

$$POVCR \leq OVCR \leq 0$$

POVCR (Procurable Over Voltage Containment Reserve) corresponds to the maximum lower power range that can be secured by the terminal to compensate for a voltage increase in the DC part of the facility.

POVCR is preferably determined according to the following equation:

$$POVCR = \max(P_{min} - P_0, POVCR^{AC})$$

$POVCR^{AC}$ is the maximum lower power reserve that can be provided by the first AC power supply network to the terminal. $P_{min}$ is the lower power limit of the terminal.

The following equation is verified:

$$POVCR^{AC} = P^{ACmin} - P_0$$

where $P^{ACmin}$ is a minimum power value that can be provided by the AC power supply network to the terminal.

Preferably, the upper power range UVCR is determined so as to satisfy the equation:

$$0 \leq UVCR \leq PUVCR$$

PUVCR (Procurable Under Voltage Containment Reserve) corresponds to the maximum upper power range that can be secured by the terminal to interrupt or compensate for a voltage drop in the DC part of the facility.

PUVCR is preferably determined according to the following equation:

$$PUVCR = \min(P_{max} - P_0, PUVCR^{AC})$$

$PUVCR^{AC}$ is the maximum upper power range that can be provided by the first AC power supply network to the terminal.

The following equation is verified:

$$PUVCR^{AC} = P^{ACmax} - P_0$$

where $P^{ACmax}$ is a maximum power value that can be provided by the AC power supply network to the terminal.

In the event of a failure of a terminal referenced "k", the management circuit is preferably configured to regulate the upper power range UVCR and the lower power range OVCR in order to satisfy at all times the following inequalities:

$$\Sigma_{m=1, m \neq k}^{N} UVCR_m \geq P_k^* \text{ if } P_k^* \geq 0$$

$$\Sigma_{m=1, m \neq k}^{N} OVCR_m \leq P_k^* \text{ if } P_k^* \leq 0$$

In these equations, N is the number of terminals of the facility, $UVCR_m$ and $OVCR_m$ are the upper and lower power ranges assigned to each of the terminals m of the facility, $P_k^*$ is the power provided or drawn by the terminal "k" in the absence of disturbance.

By maintaining these conditions, the power and voltage disturbance induced by the loss of the terminal "k" of the facility can always be interrupted or compensated by the other terminals of the facility.

Advantageously, the management circuit implements a calculation from the following optimization functions:

$$\min\left(\sum_{m=1}^{N} -\varphi_m^{OVCR} OVCR_m\right)$$

$$\min\left(\sum_{m=1}^{N} \varphi_m^{UVCR} UVCR_m\right)$$

where $\varphi_m^{OVCR}$ and $\varphi_m^{UVCR}$ are weighting coefficients dependent on the cost of supplying energy to each of the terminals of the facility.

Preferably, the upper power compensation limit $P_{upper}$ is lower than the upper power limit, so that the power provided by the terminal is limited by this upper power limit. Likewise, the lower power compensation limit $P_{lower}$ is preferably higher than the lower power limit, so that the power drawn by the terminal is limited by this lower power limit.

According to a particularly advantageous aspect of the disclosure, the limitation circuit is configured to determine an over-voltage constant $g^+$ and an under-voltage constant $g^-$, different from the over-voltage constant, associated with the terminal, and the regulation circuit is configured to vary the power provided or drawn by the terminal on the DC part of the facility by application of the linear relation:

$$\Delta P = -g^+ \Delta v_{dc} \text{ if } \Delta v_{dc} > 0 \text{ and}$$

$$\Delta P = -g^- \Delta v_{dc} \text{ if } \Delta v_{dc} < 0$$

where $\Delta P$ is the variation of the power provided or drawn by the terminal, induced by the regulation circuit, $\Delta v_{dc}$ is the voltage variation on the DC part of the facility. One advantage is to be able to easily adjust the power contribution of a terminal by adjusting the under-voltage constant or the over-voltage constant.

It is understood that the limitation circuit limits the variation of power provided or drawn by the terminal by providing the regulation circuit with the under-voltage $g^-$ and over-voltage $g^+$ constants.

The under-voltage and over-voltage constants are also called "droop" parameters.

The power variation provided or drawn by the terminal as a function of the voltage variation in the DC part of the facility is therefore linear and can be modeled by an affine function, whose under-voltage $g^-$ and over-voltage $g^+$ constants are the slope coefficients.

The lower the under-voltage constant $g^-$, the less the increase in the provided power or the decrease in the drawn power, for a given voltage drop. Likewise, the lower the over-voltage constant $g^+$, the less the drop in the provided power and the smaller the increase in the drawn power, for a given voltage increase.

The provided or drawn power variation $\Delta P$ can be adapted by modifying the under-voltage and over-voltage constants. Particularly, the limitation circuit allows determining the under-voltage constants and the over-voltage constants independently. Thanks to the device according to the disclosure, it is therefore possible to define a different variation in the power provided or drawn by the terminal for a voltage drop and for a voltage increase in the DC part. One advantage is to be able to adapt this variation to the needs of the facility and according to the upper and lower power limits of the different terminals.

The limitation circuit can determine the under-voltage and over-voltage constants centrally. These constants can be predetermined and updated periodically.

In a non-limited manner, the limitation circuit can centrally determine a plurality of under-voltage and over-voltage constants specific to a plurality of terminals.

Preferably, the limitation circuit is configured to determine an under-voltage constant $g^-$ lower than the over-voltage constant $g^+$ when the power difference between the power provided or drawn by the terminal on the DC part of the facility and the upper power limit is smaller than the determined value. One advantage is to reduce the contribution of the terminal in order to compensate for a voltage drop, when its provided or drawn power is close to the upper power limit, while allowing its contribution to the compensation for a voltage increase on the DC part.

In a non-limiting manner, for a terminal whose initially provided power is close to the upper power limit, the limitation circuit determines a low under-voltage constant, so as to reduce the provided power increase, for a given voltage drop. On the other hand, the limitation circuit determines an over-voltage constant greater than the under-voltage constant so that the provided power decrease, for a given voltage increase, is not so limited.

Advantageously, the limitation circuit is configured to determine an over-voltage constant $g^+$ smaller than the under-voltage constant $g^-$ when the power difference between the power provided or drawn by the terminal on the DC part of the facility and the lower power limit is smaller than the determined value. One advantage is to reduce the contribution of the terminal in order to compensate for a voltage increase, when its provided or drawn power is close to the lower power limit, while allowing its contribution to the compensation for a voltage drop on the DC part.

In a non-limiting manner, for a terminal initially drawing power close to the lower power limit, the limitation circuit determines a low over-voltage constant, so as to limit the drawn power increase, for a given voltage increase. On the other hand, the limitation circuit determines an under-voltage constant greater than the over-voltage constant so that the drawn power decrease, for a given voltage drop, is not so limited.

Advantageously, the limitation circuit comprises a calculator configured to determine an under-voltage constant $g^-$ verifying the relation:

$$g^- = -\frac{(P_{upper} - P_0)}{(V_{dc}^{lim-} - V_{dc0})} = -\frac{UVCR}{(V_{dc}^{lim-} - V_{dc0})}$$

where $V_{dc}^{lim-}$ is the set lower voltage limit of the DC part of the facility, $V_{dc0}$ is the nominal voltage of the DC part of the facility in the absence of disturbance and $P_0$ is the power provided or drawn by the terminal in the absence of disturbance.

One advantage is to adapt the variation of the power provided or drawn by the terminal to the limits imposed by the terminal and by the facility. The limitation circuit makes it possible in particular to jointly maintain the power provided or drawn by the terminal on the DC part below the upper power compensation limit and the voltage of the DC part above the lower voltage limit.

$P_0$ is the power provided or drawn by the terminal when the voltage of the DC part does not vary.

More preferably, the limitation circuit comprises a calculator configured to determine an over-voltage constant $g^+$ verifying the relation:

$$g^+ = -\frac{(P_0 - P_{lower})}{(V_{dc0} - V_{dc}^{lim+})} = \frac{OVCR}{(V_{dc0} - V_{dc}^{lim+})}$$

where $V_{dc}^{lim+}$ is the set upper voltage limit of the DC part of the facility, $V_{dc0}$ is the nominal voltage of the DC part of the facility in the absence of disturbance and $P_0$ is the power provided or drawn by the terminal in the absence of disturbance.

The limitation circuit makes it possible in particular to jointly maintain the power provided or drawn by the terminal on the DC part above the lower power compensation limit and the voltage of the DC part below the upper voltage limit.

Advantageously, the facility comprises a plurality of terminals each being connected between an AC power supply network and the DC part of said facility, each of the terminals being able to provide or draw power on the DC part of the facility comprised between an upper power limit and a lower power limit that are specific thereto, the regulation circuit being configured to vary the power provided or drawn by each of the terminals on the DC part of the facility, as a function of a voltage variation on the DC part of the facility, the limitation circuit being configured to limit the variation of the power provided or drawn by each of the terminals, for a given voltage variation, when the power difference between the power provided or drawn by said terminals and the upper power limit or the lower power limit that are specific thereto becomes smaller than a determined value.

The device according to the disclosure can therefore control simultaneously and centrally a plurality of terminals, independently of each other. This improves the stability of the entire facility. In addition, the failure of a terminal can be compensated by each of the other remaining terminals.

As a variant, the regulation circuit can comprise a plurality of regulation sub-circuits, each being disposed locally in the vicinity of a terminal specific thereto. Each of these regulation sub-circuits is configured to vary the power provided or drawn by the terminal specific thereto.

In a non-limiting manner, the limitation circuit can be a centralized circuit configured to limit the variations of powers provided or drawn by several terminals of the facility and, preferably, to limit the variation of the voltage in the DC part of the facility between the upper and lower voltage limits. In this variant, it provides each of the regulation sub-circuits with under-voltage and over-voltage constants specific to the terminal associated with the regulation sub-circuit.

The disclosure also relates to a multi-terminal high-voltage direct current transmission facility, comprising at least one terminal connected between a first AC power supply network and a DC part of said facility, the terminal being able to provide or draw power on the DC part of the facility comprised between an upper power limit and a lower power limit, the facility comprising a device for controlling the terminal (for example a control device according to any of the embodiments described above) further comprising at least one regulation circuit configured to vary the power provided or drawn by the terminal on the DC part of the facility, as a function of a voltage variation on the DC part of the facility, the regulation circuit comprising a limitation circuit configured to limit the variation of the power provided or drawn by the terminal, for a given voltage variation, when the power difference between the power provided or drawn by said terminal and the upper power limit or the lower power limit becomes smaller than a determined value.

Finally, the disclosure relates to a method for controlling a terminal connected in a multi-terminal high-voltage direct current transmission facility, the terminal being connected between a first AC power supply network and a DC part of said facility, the terminal being able to provide or draw power on the DC part of the facility comprised between an upper power limit and a lower power limit, the method comprising a step of varying the power provided or drawn by the terminal on the DC part of the facility, as a function of a voltage variation on the DC part of the facility, and a step of limiting the variation of the power provided or drawn by the terminal, for a given voltage variation, when the power difference between the power provided or drawn by said terminal and the upper power limit or the lower power limit becomes smaller than a determined value This method can implement steps corresponding to each of the embodiments of the control device as described above.

BRIEF DESCRIPTION OF THE DRAWINGS

The disclosure will be better understood upon reading the following description of one embodiment of the disclosure given by way of non-limiting example, with reference to the appended drawings, in which.

DETAILED DESCRIPTION

The disclosure relates to a device 10 for controlling a terminal 100 connected to a multi-terminal high-voltage direct current HVDC transmission facility 14.

Figure 4:
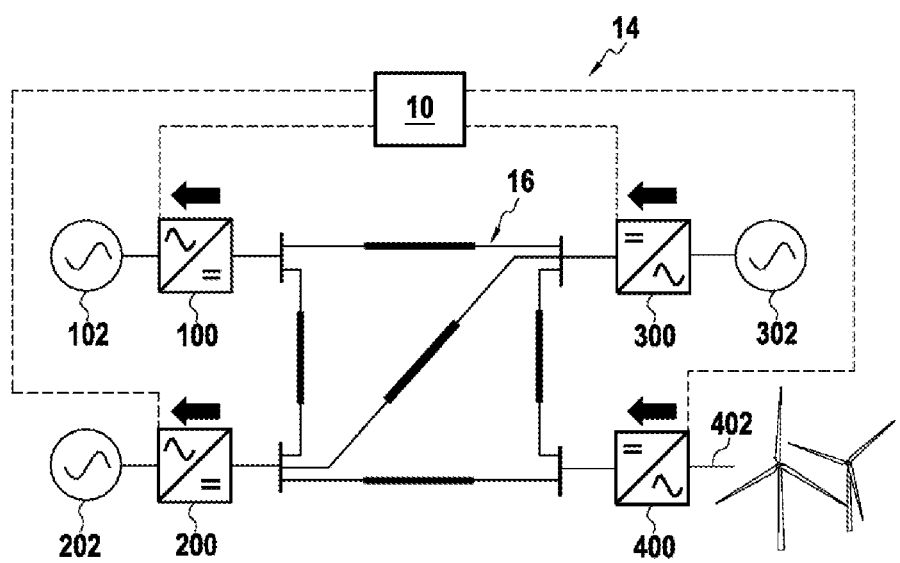
FIG. 4 illustrates an HVDC facility whose terminals are controlled by a control device according to the disclosure.

FIG. 4 illustrates a facility 14 comprising first 100, second 200, third 300 and fourth 400 terminals as well as a control device 10 according to the disclosure. In this example, the control device 10 is configured to control the first 100, second 200, third 300 and fourth 400 terminals.

The first 100, second 200, third 300 and fourth 400 terminals are connected respectively to first 102, second 202, third 302 and fourth 402 AC power supply networks. It can be observed that the fourth terminal 400 is connected to a wind farm. These four terminals are also connected to a DC part 16 of the facility 14 via direct current lines. The terminals are voltage converters, configured to convert an AC voltage into a DC voltage and vice versa An example of a control device 10 according to the disclosure, for controlling the first 100, second 200, third 300 and fourth 400 terminals of the facility 14 is given in FIG. 5. This control device 10 comprises a regulation circuit 20, a power distribution circuit 22, a limitation circuit 24 and a synchronization circuit 23. The limitation circuit 24 comprises a management circuit 26 and a calculator 28.

In this non-limiting example, the regulation circuit 20 is disposed centrally. As a variant, the regulation circuit 20 may include a plurality of regulation sub-circuits, each being disposed locally in the vicinity of a terminal specific thereto and from which it regulates the power provided or drawn on the DC part of the facility.

The power distribution circuit 22 receives as input measured voltage values $V_{dc1\ldots Nst}$ on the DC part 16 of the facility 14 as well as measured values $P_{1\ldots Nst}$ and power setpoints $P^*_{1\ldots Nst}$ provided or drawn by the terminals of the facility. It outputs power setpoints provided or drawn $P^*_{1\ldots Nst}$ by the terminals as well as voltage setpoints $V^*_{dc1\ldots Nst}$ of the DC part. The power distribution circuit 22 is configured to restore the power of the facility following a disturbance. The management circuit 26 receives as input maximum $P^{ACmax}_{1\ldots Nst}$ and minimum $P^{ACmin}_{1\ldots Nst}$ power values which can be provided by the AC power supply networks to the terminals of the facility 14, as well as power setpoints provided or drawn $P^*_{1\ldots Nst}$ by the terminals, provided by the power distribution circuit 22.

The management circuit 26 of the limitation circuit 24 is configured to output upper $P_{upper1\ldots Nst}$ and lower $P_{lower1\ldots Nst}$ power compensation limits allocated to each of the terminals.

The calculator 28 receives in input the power compensation limits $P_{upper1\ldots Nst}$ and $P_{lower1\ldots Nst}$ delivered by the management circuit 26 and is configured to determine and output over-voltage constants $g^+_{1\ldots Nst}$ and under-voltage constants $g^-_{1\ldots Nst}$ associated with each of the terminals.

The synchronization circuit 23 receives as input the power setpoints provided or drawn $P^*_{1\ldots Nst}*$ by the terminals as well as the voltage setpoints $v^*_{dc1\ldots Nst}$ of the DC part, delivered by the power distribution circuit 22. This synchronization circuit 23 ensures the temporal coherence between these setpoints.

The regulation circuit 20 receives as input the power setpoints provided or drawn $P^*_{1\ldots Nst}$ by the terminals as well as the voltage setpoints $V^*_{dc1\ldots Nst}$ of the DC part as well as the over-voltage $g^+_{1\ldots Nst}$ and under-voltage $g^-_{1\ldots Nst}$ constants provided by the synchronization circuit 23.

The regulation circuit 20 varies the power provided or drawn by the terminals 100, 200, 300, 400 of the facility as a function of said provided or drawn power setpoints, said voltage setpoints as well as over-voltage and under-voltage constants. In the variant where the regulation circuit comprises a plurality of sub-circuits located locally in the vicinity of the terminals, each of the sub-circuits varies the power provided or drawn by the terminal with which it is associated, as a function of said setpoints and constants.

Figure 6:
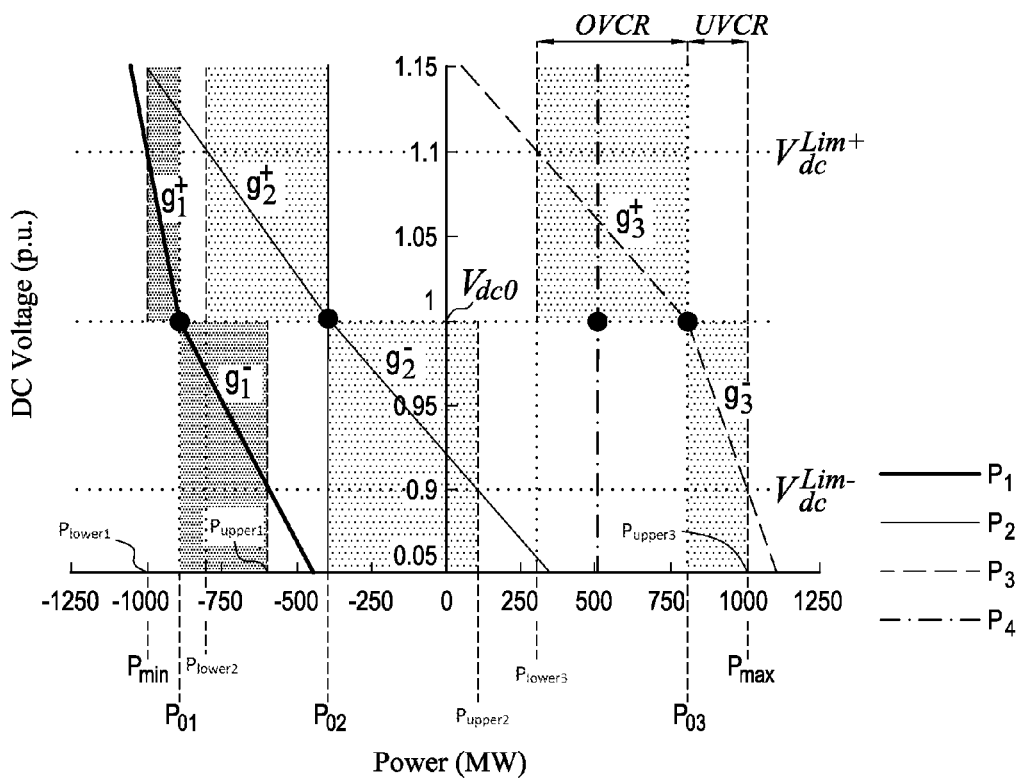
FIG. 6 illustrates the change in the power of the terminals of FIG. 4 as a function of the voltage of the DC part.

FIG. 6 is a graph illustrating the change of the powers provided or drawn by the first 100, second 200, third 300 and fourth 400 terminals of the facility of FIG. 4, as a function of the voltage variation in the DC part 16 of the facility 14, these terminals being controlled by a control device 10 according to the disclosure.

It can be observed that, in this example, the fourth terminal 400 provides the DC part 16 of the facility with a constant power $P_4$ equal to 500 MW. The first and second terminals 100, 200 operate in inverter mode, so that they draw power on the DC part of the facility. In this example, the drawn power $P_1$ by the first terminal has an initial value $P_{01}$ equal to −900 MW while the power $P_2$ drawn by the second terminal has an initial value $P_{02}$ equal to −400 MW. The third terminal operates in rectifier mode, so that it provides the DC part 16 with a power $P_3$ having an initial value $P_{03}$ equal to 800 MW. In this non-limiting example, the nominal power of the terminals is 1000 MW. Also, the powers $P_{1,2,3}$ drawn or provided by the first, second and third terminals can vary between an upper power limit $P_{max}$ equal to 1000 MW and a lower power limit $P_{min}$ equal to −1000 MW.

The voltage of the DC part 16 of the facility 14 is initially $V_{dc0}$, which is equivalent in this graph to 1 voltage unit, for reasons of simplification. The voltage variation in the DC part 16 is limited by an upper voltage limit $V_{dc}^{lim+}$ and a lower voltage limit $V_{dc}^{lim-}$. In the example of FIG. 6, these upper and lower voltage limits represent a variation of 10% relative to the initial voltage $V_{dc0}$.

The curves $P_1$ and $P_2$ represent respectively the change in the power drawn by the first terminal 100 and by the second terminal 200 in response to a voltage variation on the DC part 16. The curve $P_3$ represents the change in the power provided by the third terminal 300 to the DC part.

Firstly, the management circuit 26 of the limitation circuit 24 determines the upper $P_{upper1 \ldots Nst}$ and lower $P_{lower1 \ldots Nst}$ power compensation limits allocated to each of the terminals 100, 200, 300. These limits define higher UVCR and lower OVCR power ranges in which the power provided or drawn by each of the terminals can vary. The ranges allocated by the limitation circuit 24 to each of the terminals are darkened in FIG. 6. The upper and lower ranges of the third terminal are denoted UVCR (Under Voltage Containment Reserve) and OVCR (Over Voltage Containment Reserve).

In this example, the lower compensation limit $P_{lower1}$ allocated to the first terminal 100 is set to −1000 MW, so as to correspond to the lower power limit $P_{min}$ of the terminals. The power $P_{01}$ initially drawn by the first terminal 100 being −900 MW, it is understood that the first terminal can draw up to additional 100 MW on the DC part 16 of the facility 14. The upper compensation limit $P_{upper1}$ allocated to the first terminal is set to −600 MW. The lower compensation limit $P_{lower2}$ allocated to the second terminal 200 is set to 800 MW and its upper compensation limit $P_{upper2}$ is set to 100 MW. The lower compensation limit $P_{lower3}$ allocated to the third terminal 300 is set to 300 MW. The upper compensation limit $P_{upper3}$ allocated to the third terminal 300 is set to 1000 MW so as to correspond to the upper power limit $P_{max}$ of the terminals. The initial power $P_{03}$ provided by the third terminal 300 being 800 MW, it is understood that the power it provides to the DC part can increase by 200 MW at most.

The limitation circuit calculator then determines first $g_1^+$ second $g_2^+$ and third $g_3^+$ over-voltage constants and the first $g_1^-$, second $g_2^-$ and third $g_3^-$ under-voltage constants associated respectively with first 100, second 200 and third 300 terminals. These constants are determined to verify:

$$g_{1,2,3}^- = -\frac{P_{upper1,2,3} - P_{01,02,03}}{V_{dc}^{lim-} - V_{dc0}} = -\frac{UVCR_{1,2,3}}{V_{dc}^{lim-} - V_{dc0}} \text{ and}$$

$$g_{1,2,3}^+ = -\frac{P_{01,02,03} - P_{lower1,2,3}}{V_{dc0} - V_{dc}^{lim+}} = \frac{OVCR_{1,2,3}}{V_{dc0} - V_{dc}^{lim+}}$$

According to the disclosure, the limitation circuit 24 determines an under-voltage constant $g_3^-$ of the third terminal 300 less than its over-voltage constant $g_3^+$, insofar as the power difference between the initial power $P_{03}$ of the third terminal and the upper power limit $P_{max}$ of the third terminal 300 is low, and more particularly smaller than a determined value, for example 300 MW. Similarly, the over-voltage constant $g_1^+$ of the first terminal 100 is smaller than its over-voltage constant $g_1^-$, insofar as the power difference between the initial power $P_{01}$ of the first terminal 100 and the lower power limit $P_{lower}$ of the first terminal is low, and more particularly smaller than a determined value, for example 300 MW.

The regulation circuit 20 is then configured to vary the power provided or drawn by each of the terminals on the DC part of the facility by application of the linear relation:

$\Delta P_{1,2,3} = -g_{1,2,3}^+ \Delta v_{dc}$ if $\Delta v_{dc} > 0$ and $\Delta P_{1,2,3} = -g_{1,2,3}^- \Delta v_{dc}$ if $\Delta v_{dc} < 0$ In response to a positive or negative voltage variation on the DC part of the facility, the regulation circuit 20 therefore varies linearly the power $P_{1,2,3}$ provided or drawn by each of the terminals 100, 200, 300 on the DC part 16, the over-voltage $g_{1,2,3}^+$ and under-voltage $g_{1,2,3}^-$ constants constituting the slope coefficients of the power variation lines as a function of the voltage variation on the DC part.

The over-voltage $g_{1,2,3}^+$ and under-voltage $g_{1,2,3}^-$ constants are determined so that the powers $P_{1,2,3}$ provided or drawn by the terminals reach the lower power compensation limits $P_{lower1,2,3}$ when the voltage of the DC part reaches the upper voltage limit $V_{dc}^{lim+}$ and so that the powers $P_{1,2,3}$ provided or drawn by the terminals reach the upper power compensation limits $P_{upper1,2,3}$ when the voltage of the DC part reaches the lower voltage limit $V_{dc}^{lim-}$. The operating constraints of the terminals are therefore better met.

It is observed that, thanks to the disclosure, the increase of the power provided to the DC part of the third terminal 300, whose power $P_{03}$ initially provided to the DC part 16 is close to its upper power limit $P_{max}$, is reduced for a given voltage drop. The under-voltage constant $g_3^-$ associated thereto by the limitation circuit 24 is low. The contribution of this third terminal 300 to the compensation for the voltage drop is therefore reduced.

Similarly, the increase of the power drawn on the DC part of the first terminal 100, whose power $P_{01}$ initially provided to the DC part 16 is close to its lower power limit $P_{min}$, is reduced for a given voltage increase. The over-voltage constant $g_1^+$ associated therewith by the limitation circuit 24 is low. The contribution of this first terminal to the compensation for the voltage increase is therefore reduced.

Thanks to the disclosure, the power $P_3$ provided by the third terminal 300 reaches the upper power limit $P_{max}$ when the lower voltage limit $V_{dc}^{lim-}$ is reached. Similarly, the power $P_1$ drawn by the first terminal 100 reaches the lower power limit $P_{min}$ when the upper voltage limit $V_{dc}^{lim+}$ is reached. Also, the voltage of the DC part 16 of the facility 14 is maintained between the upper and lower voltage limits chosen.

In the example of FIG. 6, the calculator 28 of the limitation circuit 24 determines the following over-voltage constants: $g_1^+ = 1.563$ MW/kV for the first terminal 100, $g_2^+ = 6.250$ MW/kV for the second terminal 200, $g_3^+ = 7.813$ MW/kV for the third terminal 300. The calculator 28 of the limitation circuit 24 also determines the following under-voltage constants: $g_1^- = 4.688$ MW/kV for the first terminal 100, $g_2^- = 7.813$ MW/kV for the second terminal 200, $g_3^- = 3.125$ MW/kV for the third terminal 300. The limitation circuit can implement an algorithm for calculating over-voltage and under-voltage constants.

Figure 1:
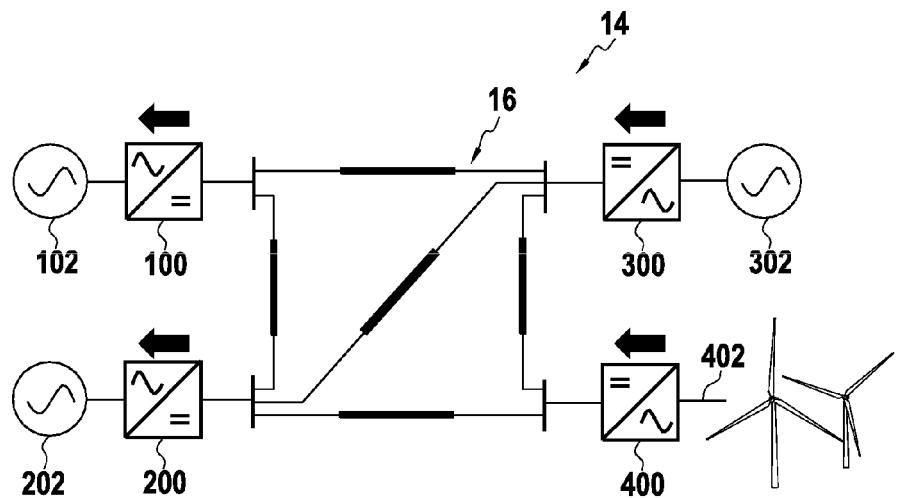
FIG. 1 illustrates an HVDC facility according to the prior art.
Figure 2:
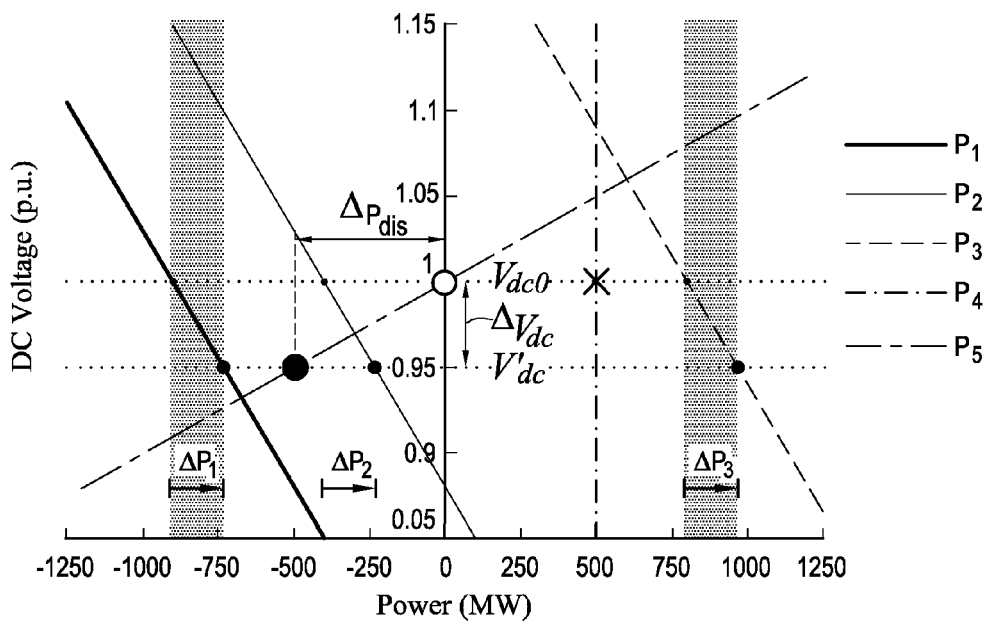
FIG. 2 illustrates the change in the voltage of the DC part of the facility of FIG. 1, in response to the failure of the fourth terminal.
Figure 3:
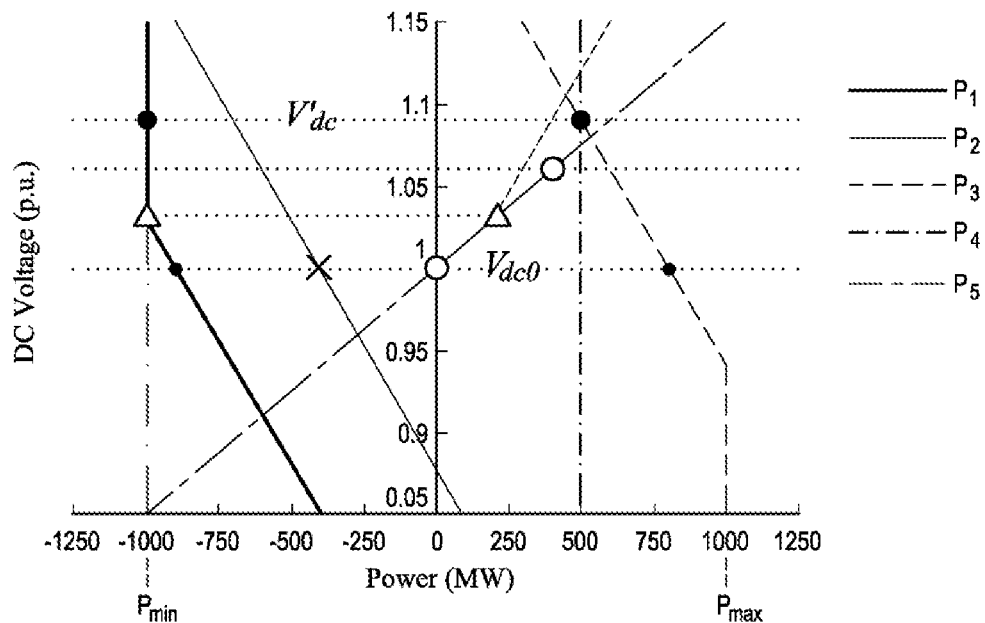
FIG. 3 illustrates the change in the power of the terminals of FIG. 1, in response to the failure of the second terminal.
Figure 7:
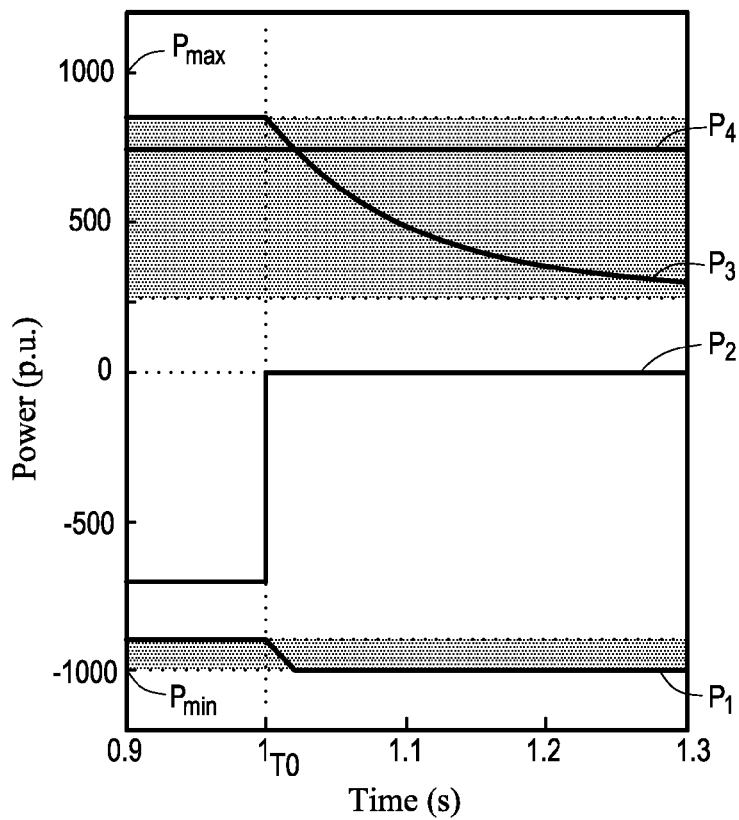
FIG. 7 illustrates the power variations in the terminals of the facility of FIG. 1, controlled by a device according to the prior art.

FIG. 7 illustrates the results of simulation of the change in the power of the terminals 100, 200, 300, 400 of the facility 14 of FIG. 1 controlled by a device according to the prior art. At time $t_0$, there is a simulation of the failure of the second terminal 200 of the facility 14, which then no longer draws power on the DC part 16 of the facility. The power $P_2$ of the second terminal 200 becomes zero at time $t_0$. It is observed that the power $P_1$ of the first terminal 100 very quickly reaches the lower power limit $P_{min} = 1000$ MW, and the first terminal 100 enters into saturation. The control device according to the prior art does not take into account the upper $P_{max}$ and lower $P_{min}$ power limits of the terminals so that the variation of the power provided or drawn by these terminals is not adapted to the approach to these power limits. The power provided or drawn by these terminals may reach the upper $P_{max}$ and lower $P_{min}$ power limits and must be then put into saturation.

Figure 8:
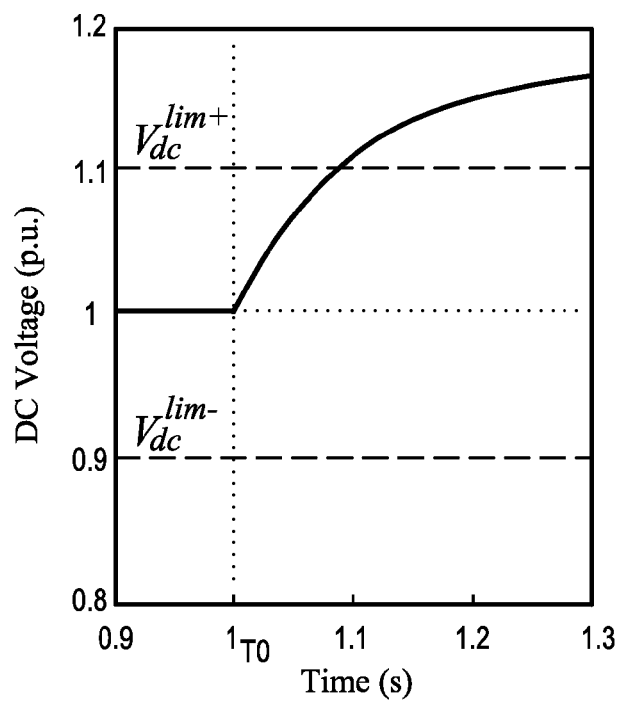
FIG. 8 illustrates the voltage variation in the DC part of the facility of FIG. 1, whose terminals are controlled by a device according to the prior art.

From the moment when the first terminal 100 enters into saturation, the power $P_2$ it draws can no longer increase to interrupt or compensate for the voltage increase. It can no longer contribute to the compensation for the voltage variation on the DC part 16 of the facility 14. Only the third terminal 300 therefore contributes to the voltage variation compensation, which is not sufficient. The voltage variation is no longer sufficiently compensated, which leads to an even greater voltage variation. Consequently, as can be seen in FIG. 8, the voltage of the DC part increases until it exceeds the upper voltage limit $V_{dc}^{lim+}$.

Figure 5:
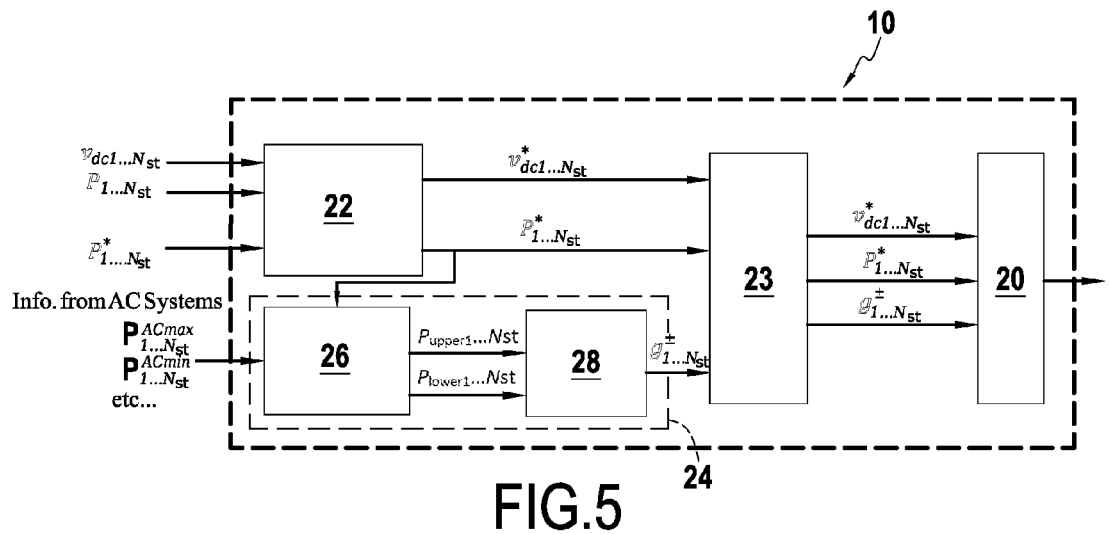
FIG. 5 illustrates a control device according to the disclosure.
Figure 9:
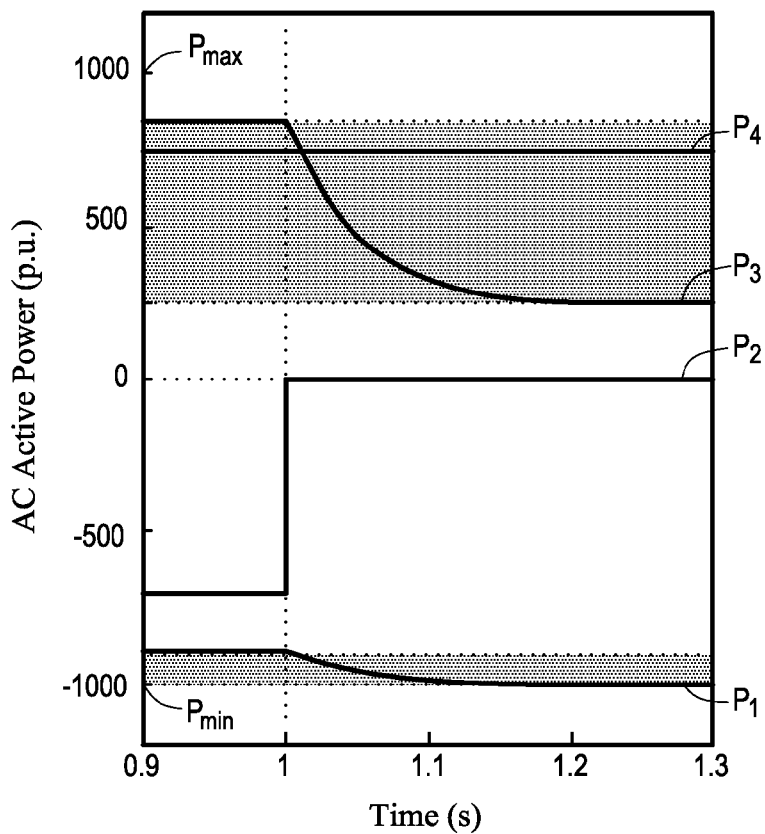
FIG. 9 illustrates the power variations in the terminals of the facility of FIG. 4, controlled by a device according to the disclosure.

FIG. 9 illustrates the results of simulation of the change in the power of the terminals 100, 200, 300, 400 of the facility 14 of FIG. 5 controlled by a device 10 according to the disclosure. At time $t_0$, there is also a simulation of the failure of the second terminal 200 of the facility 14, which then no longer draws power on the DC part 16 of the facility. The power $P_2$ of the second terminal 200 becomes zero at time $t_0$. It is observed that the power $P_1$ of the first reached terminal 100 tends gently towards the lower power limit $P_{min}=-1000$ MW, in an asymptotic manner. The control device according to the disclosure takes into account the upper $P_{max}$ and lower $P_{min}$ power limits of the terminals so that the variation of the power provided or drawn by these terminals is adapted to the approach to these power limits, so as to avoid saturating the terminals.

Figure 10:
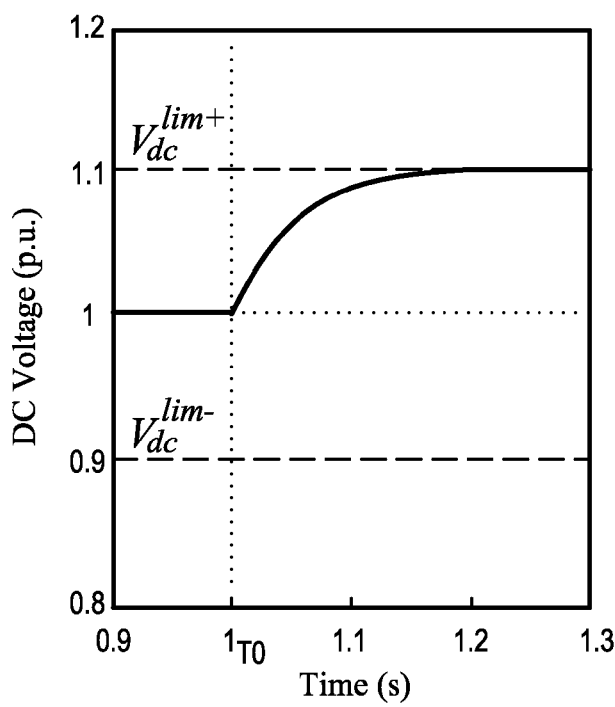
FIG. 10 illustrates the voltage variation in the DC part of the facility of FIG. 4, whose terminals are controlled by a device according to the disclosure.

As observed in FIG. 10, the voltage of the DC part is maintained below the upper voltage limit $V_{dc}^{lim+}$ and tends towards this limit in an asymptotic manner. The terminals are not overloaded, and do not enter into saturation, regardless of the voltage variation. The device according to the disclosure allows a better distribution of the compensation powers.

The invention claimed is:

1. A device for controlling a terminal connected in a multi-terminal high-voltage direct current transmission facility, the terminal being connected between a first AC power supply network and a DC part of said facility, the terminal configured to provide or draw power on the DC part of the facility comprised between an upper power limit and a lower power limit, the device further comprising at least one regulation circuit configured to vary the power provided or drawn by the terminal on the DC part of the facility, as a function of a voltage variation on the DC part of the facility, the device further comprising a limitation circuit configured to limit the variation of the power provided or drawn by the terminal, for a given voltage variation, when the power difference between the power provided or drawn by said terminal and the upper power limit or the lower power limit becomes smaller than a determined value.

2. The control device according to claim 1, wherein the regulation circuit is configured to increase the power provided or to decrease the power drawn by the terminal on the DC part of the facility in the event of a voltage drop on the DC part of the facility.

3. The control device according to claim 2, wherein the limitation circuit is configured to limit the increase in the power provided or the decrease in the power drawn by the terminal on the DC part of the facility, for a given voltage drop, when the power difference between said power provided or drawn by the terminal and the upper power limit is smaller than the determined value.

4. The control device according to claim 1, wherein the regulation circuit is configured to decrease the power provided or to increase the power drawn by the terminal on the DC part of the facility in the event of a voltage increase on the DC part of the facility.

5. The control device according to claim 4, wherein the limitation circuit is configured to limit the decrease of the power provided or the increase of the power drawn by the terminal on the DC part of the facility, for a given voltage increase, when the power difference between said power provided or drawn by the terminal and the lower power limit becomes smaller than the determined value.

6. The control device according to claim 1, wherein the limitation circuit is configured to increase the variation of the power provided or drawn by the terminal on the DC part of the facility, for a given voltage variation, when the power difference between said power provided or drawn by the terminal and the upper power limit or the lower power limit becomes greater than an additional determined value.

7. The control device according to claim 1, wherein the limitation circuit comprises a management circuit configured to allocate to the terminal an upper power compensation limit $P_{upper}$ and a lower power compensation limit $P_{lower}$ from maximum and minimum power values provided by the first AC power supply network and from operating power setpoints of the terminal.

8. The control device according to claim 1, wherein the limitation circuit is configured to determine an overvoltage constant $g^+$ and an under-voltage constant $g^-$, different from the overvoltage constant, associated with the terminal, and wherein the regulation circuit is configured to vary the power provided or drawn by the terminal on the DC part of the facility by application of the linear relation:

$\Delta P = -g^{+\Delta v}{}_{dc}$ if $\Delta v_{dc} > 0$ and $\Delta P = -g^{-\Delta v}{}_{dc}$ if $\Delta v_{dc} < 0$ where $\Delta P$ is the variation of the power provided or drawn by the terminal, induced by the regulation circuit, $\Delta v_{dc}$ is the voltage variation on the DC part of the facility.

9. The control device according to claim 8, wherein the limitation circuit is configured to determine an under-voltage constant $g^-$ smaller than the overvoltage constant $g^+$ when the power difference between the power provided or drawn by the terminal on the DC part of the facility and the upper power limit is smaller than the determined value.

10. The control device according to claim 8, wherein the limitation circuit is configured to determine an overvoltage constant $g^+$ smaller than the under-voltage constant $g^-$ when the power difference between the power provided or drawn by the terminal on the DC part of the facility and the lower power limit is smaller than the determined value.

11. The control device according to claim 8, wherein the limitation circuit comprises a management circuit configured to allocate to the terminal an upper power compensation limit $P_{upper}$ and a lower power compensation limit $P_{lower}$ from maximum and minimum power values provided by the first AC power supply network and from operating power setpoints of the terminal, and wherein the limitation circuit comprises a calculator configured to determine an under-voltage constant $g^-$ satisfying the relation:

$$g^- = -\frac{P_{upper} - P_0}{V_{dc}^{lim-} - V_{dc0}}$$

where $V_{dc}^{lim-}$ is the set lower voltage limit of the DC part of the facility, $V_{dc0}$ is the nominal voltage of the DC part of the facility in the absence of disturbance and $P_0$ is the power provided or drawn by the terminal in the absence of disturbance.

12. The control device according to claim 8, wherein the limitation circuit comprises a management circuit configured to allocate to the terminal an upper power compensation limit $P_{upper}$ and a lower power compensation limit $P_{lower}$ from maximum and minimum power values provided by the first AC power supply network and from operating power setpoints of the terminal, and wherein the limitation circuit comprises a calculator configured to determine an overvoltage constant $g^+$ satisfying the relation:

$$g^+ = -\frac{P_0 - P_{lower}}{V_{dc0} - V_{dc}^{lim+}}$$

where $V_{dc}^{lim+}$ is the set upper voltage limit of the DC part of the facility, $V_{dc0}$ is the nominal voltage of the DC part of the facility in the absence of disturbance and $P_0$ is the power provided or drawn by the terminal in the absence of disturbance.

13. The control device according to claim 1, wherein the facility comprises a plurality of terminals each connected between an AC power supply network and the DC part of said facility, each of the terminals configured to provide or draw power on the DC part of the facility comprised between an upper power limit and a lower power limit that are specific thereto, the regulation circuit being configured to vary the power provided or drawn by each of the terminals on the DC part of the facility, as a function of a voltage variation on the DC part of the facility, the limitation circuit being configured to limit the variation of the power provided or drawn by each of the terminals, for a given voltage variation, when the power difference between the power provided or drawn by said terminals and the upper power limit or the lower power limit that are specific thereto is smaller than a determined value.

14. A multi-terminal high-voltage direct current transmission facility, comprising at least one terminal connected between a first AC power supply network and a DC part of said facility, the terminal configured to provide or draw power on the DC part of the facility comprised between an upper power limit and a lower power limit, the facility comprising a device for controlling the terminal further comprising at least one regulation circuit configured to vary the power provided or drawn by the terminal on the DC part of the facility, as a function of a voltage variation on the DC part of the facility, the regulation circuit comprising a limitation circuit configured to limit the variation of the power provided or drawn by the terminal, for a given voltage variation, when the power difference between the power provided or drawn by said terminal and the upper power limit or the lower power limit becomes smaller than a determined value.

15. A method for controlling a terminal connected in a multi-terminal high-voltage direct current transmission facility, the terminal being connected between a first AC power supply network and a DC part of said facility, the terminal configured to provide or draw power on the DC part of the facility comprised between an upper power limit and a lower power limit, the method comprising:
varying the power provided or drawn by the terminal on the DC part of the facility, as a function of a voltage variation on the DC part of the facility; and
limiting the variation of the power provided or drawn by the terminal, for a given voltage variation, when the power difference between the power provided or drawn by said terminal and the upper power limit or the lower power limit becomes smaller than a determined value.

\* \* \* \* \*